United States Patent
Rasala et al.

(10) Patent No.: US 6,487,332 B1
(45) Date of Patent: Nov. 26, 2002

(54) STRICTLY NON-BLOCKING WAVELENGTH DIVISION MULTIPLEXED (WDM) CROSS-CONNECT DEVICE FOR USE IN A HETEROGENEOUS NETWORK

(75) Inventors: April Patricia Rasala, Newton, MA (US); Gordon Thomas Wilfong, Gillette, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/471,925

(22) Filed: Dec. 23, 1999

(51) Int. Cl.$^7$ ............................... G02B 6/26; G02B 6/42
(52) U.S. Cl. .............................. 385/17; 385/16; 385/24; 359/128
(58) Field of Search ............................. 385/16, 17, 24; 359/128

(56) References Cited

U.S. PATENT DOCUMENTS 5,446,809 A * 8/1995 Fritz ........................... 385/17
6,067,389 A * 5/2000 Fatehi ......................... 385/17

OTHER PUBLICATIONS

A. Rasala and G. Wilfong,; Strictly Non–blocking WDM Cross–connects for Heterogeneous Networks, May 2001.
G. Wilfong, "Strictly non–blocking WDM cross connects", Jan. 2000.
G. Wilfong, B. Mikkelsen, C. Doerr and M. Zirngibl; WDM Cross–Connect Architectures with Reduced Complexity; Journal of Lightwave Technology, vol. 17, No. 10, Oct. 1999, pp. 1–10.

* cited by examiner

Primary Examiner—Cassandra Spyrou
Assistant Examiner—Leo Boutsikaris
(74) Attorney, Agent, or Firm—Thomas Kayden Horstermeyer & Risley LLP

(57) ABSTRACT

The present invention provides a strictly non-blocking WDM cross-connect that utilizes a relatively small number of wavelength interchangers. In accordance with one embodiment, the WDM cross-connect utilizes $n_1 k_1$ wavelength interchangers, where $n_1$ is an integer equal to the number of wavelengths carried on an input optical fiber associated with the WDM cross-connect and $k_1$ is the total number of input optical fibers to the WDM cross-connect. Each of the wavelength interchangers is connected to exactly one input port of the fabric and each input port of the fabric is connected to exactly one wavelength interchanger. The input optical fibers of the WDM cross-connect are connected to $k_1$ optical switches of the cross-connect that separate out the $n_1$ wavelengths onto $n_1$ optical fibers, which are input to respective wavelength interchangers. Therefore, each wavelength interchanger receives exactly $n_1$ optical fibers. The fabric has output ports that are connected to $k_2$ output optical fibers, where $k_2$ is an integer equal to the number of output optical fibers that are connected to the output ports of the fabric. In accordance with another embodiment of the present invention, the WDM cross-connect comprises two fabrics and one or more wavelength interchangers that interconnect the fabrics. The cross-connect in accordance with this embodiment can be rendered strictly non-blocking by utilizing a number of wavelength interchangers equal to $(k_1+k_2)-1$, where $k_1$ and $k_2$ correspond to the number of input and output optical fibers, respectively, of the WDM cross-connect. In accordance with both of these embodiments, the number of input and output optical fibers of the strictly non-blocking WDM cross-connect can be unequal.

22 Claims, 3 Drawing Sheets

STRICTLY NON-BLOCKING WAVELENGTH DIVISION MULTIPLEXED (WDM) CROSS-CONNECT DEVICE FOR USE IN A HETEROGENEOUS NETWORK

TECHNICAL FIELD OF THE INVENTION

The present invention relates to a wavelength division multiplexed (WDM) cross-connect device for use in optical networks. More particularly, the present invention relates to a WDM cross-connect device that may be configured to be strictly non-blocking.

BACKGROUND OF THE INVENTION

A wavelength division multiplexed (WDM) cross-connect device, hereinafter referred to as a WDM cross-connect, is a network of fibers connected to various optical components that allow a set of input fibers to be connected to a set of output fibers. Each fiber in the network can support some number n of wavelength channels. In other words, at any time there can be up to n signals along a fiber with each signal using a distinct wavelength. WDM cross-connects are capable of performing wavelength interchanging by connecting a wavelength channel on an input fiber to a different wavelength channel on an output fiber. WDM cross-connects comprise components that are capable of switching an incoming wavelength channel onto any different wavelength channel on an outgoing fiber. These components are commonly referred to as wavelength interchangers.

Another type of component comprised by WDM cross-connects is known as an optical switch. An optical switch has an arbitrary number of fibers passing into it and out of it and any wavelength channel on any incoming fiber can be switched to the same wavelength channel on any outgoing fiber, assuming the wavelength channel is not already being used. The WDM cross-connect also comprises optical fibers that are connected to the optical switches and to the wavelength interchangers at nodes. The optical fibers provide directed paths through the WDM cross-connect in the sense that the signal on any optical fiber only travels in a forward direction through the cross-connect and can never meet itself.

When a request for a connection in a WDM cross-connect is made, the WDM cross-connect must perform two fundamental tasks. First of all, a route or path must be found in the WDM cross-connect from the requested input fiber to the requested output fiber. Secondly, for each fiber in the route, an unused wavelength channel must be assigned so that (1) the wavelength channels assigned on the input and output fibers are the requested wavelength channels, and (2) the wavelength channels assigned on any two consecutive fibers in the route are the same, unless there is a wavelength interchanger connecting the two consecutive fibers.

WDM cross-connects have been proposed that have "non-blocking" properties. The term "non-blocking" corresponds to the ability of the WDM cross-connect to satisfy requests for connections, i.e., the requests are not "blocked" as a result of an unavailable route or wavelength channel. Some of these WDM cross-connects are rearrangeably non-blocking, which means that satisfying requests for new connections may require changing the paths and/or the wavelength channels of already-configured connections. In a WDM cross-connect, disrupting connections in order to create new connections is undesirable since doing so requires buffering of the connections that are to be rearranged.

A WDM cross-connect is considered to be pathwise rearrangeably non-blocking in cases where connection requests can be routed through the cross-connect, but any additional requests received after routing the original set of requests may require some of the previously routed requests to be re-routed. Some WDM cross-connects are considered to be pathwise wide-sense non-blocking. These WDM cross-connects employ a routing algorithm that enables any sequence of connection requests and withdrawals to be satisfied without disturbing any of the currently routed requests. Pathwise strictly non-blocking cross-connects are known that enable any set of requests to be routed through the cross-connect without disturbing the routes associated with previous requests.

A request for a connection requires not only a route from the input fiber to the output fiber, but also a wavelength channel assignment along the route that only changes wavelength channels at wavelength interchangers and that begins and ends on the requested wavelength channels. These requests for connections between wavelength channels on input and output fibers are commonly referred to as demands. When a demand is made following a previously routed demand, the routes and/or the wavelength channel assignments associated with the previously routed demands may need to be changed. The definitions of wavelength rearrangeably non-blocking, wavelength wide-sense non-blocking and wavelength strictly non-blocking are analogous to the definitions provided above for pathwise rearrangeably non-blocking, pathwise wide-sense non-blocking and pathwise strictly non-blocking, respectively.

A WDM cross-connect that is both pathwise and wavelength strictly non-blocking will be referred to hereinafter as a strictly non-blocking WDM cross-connect. One known type of strictly non-blocking WDM cross-connect that it is capable of handling new requests for connections without disturbing those already existing utilizes k log k wavelength interchangers, where k corresponds to the number of input fibers and output fibers. Therefore, the number of wavelength interchangers utilized in this type of WDM cross-connect is relatively large. Since the overall cost of a WDM cross-connect is primarily attributable to the costs associated with the wavelength interchangers, it is desirable to minimize the number of wavelength interchangers incorporated into the WDM cross-connect. Therefore, it would be desirable to provide a strictly non-blocking cross-connect that minimizes the number of wavelength interchangers that are needed to provide the WDM cross-connect with strictly non-blocking properties.

FIG. 1 is a block diagram of a WDM cross-connect 1 that is commonly referred to as a standard design WDM cross-connect. The fabric 2 between the input optical fibers 3 and the output optical fibers 4 of the WDM cross-connect 1 includes a plurality of nodes (not shown) and a plurality of optical fibers (not shown) that interconnect the nodes. Each of the nodes is comprised of a wavelength granularity switch that switches signals received by the fabric 2 on the input fibers 3 onto selected output fibers 4. The WDM cross-connect 1 comprises a controller 6 that controls the operations of the fabric 2 and of the wavelength interchangers 5. The controller 6 causes the wavelength granularity switches to select an appropriate output fiber 4 so that the wavelength of the signal routed onto the output fiber 4 will not be the same as the wavelength of a signal that already exists on the output fiber 4.

The WDM cross-connect 1 comprises k wavelength interchangers 5, where k is a positive integer equal to the number of input fibers 3 and output fibers 4. Each wavelength interchanger 5 is connected to a single input fiber 3. Each input fiber 3 is capable of simultaneously carrying signals at n wavelengths, $\lambda_1$ through $\lambda_n$, where $\lambda$ denotes wavelength and n is a positive integer. Therefore, each input fiber supports n wavelength channels. Each of the wavelength interchangers 5 is capable of permuting the wavelength of a signal on the input fiber 3 to a different wavelength. The fabric 2 then causes the signal to be routed onto a selected output fiber 4. The controller 6 controls the selection of the wavelength channels by the wavelength interchangers 5.

FIG. 2 is a block diagram of a WDM cross-connect 7 that is commonly referred to as a modified standard design WDM cross-connect. The WDM cross-connect 7 is a modification of the design shown in FIG. 1 and includes a wavelength interchanger 8 connected to each of the output fibers 4. The WDM cross-connect 7 comprises 2 k wavelength interchangers. The additional wavelength interchangers 8 connected to the output optical fibers 4 enable the wavelength channel utilized by a signal on any of the output optical fibers 4 to be permuted. This enables demands to be handled that specify a particular output wavelength, which is not the case with the WDM cross-connect 1 shown in FIG. 1.

The additional wavelength interchangers 8 provide the WDM cross-connect 7 with improved versatility. However, 2 k wavelength interchangers are utilized by the WDM cross-connect 7, which significantly increases the cost of the cross-connect in comparison to the cost associated with the cross-connect shown in FIG. 1. The cross-connects 1 and 7 are, at best, rearrangeably non-blocking.

Accordingly, a need exists for a strictly non-blocking WDM cross-connect design that minimizes the number of wavelength interchangers that are needed to provide the WDM cross-connect with strictly non-blocking properties. A need also exists for such a WDM cross-connect that is suitable for use in a heterogeneous network, i.e., in a network that is comprised of sub-networks that are produced by different manufacturers. In accordance with the present invention, the number of input and output fibers of the WDM cross-connect may be different and/or the number of input and output wavelengths of the WDM cross-connect may be different. Furthermore, the input wavelengths may be different from the output wavelengths. Thus, in situations where downstream equipment or sub-systems require different wavelengths, a different number of wavelengths, a different number of fibers, a different number of wavelengths per fiber, etc., the WDM cross-connect of the present invention can be configured to meet those needs and to do so in a strictly non-blocking manner.

SUMMARY OF THE INVENTION

The present invention provides a strictly non-blocking WDM cross-connect that utilizes a relatively small number of wavelength interchangers. The present invention provides two embodiments for the strictly non-blocking WDM cross-connect, each of which is capable of utilizing different numbers of input and output optical fibers. The first embodiment of the WDM cross-connect of the present invention utilizes $n_1 k_1$ wavelength interchangers whereas the second embodiment utilizes $(k_1+k_2)-1$ wavelength interchangers, where $k_1$, $n_1$ and $k_2$ are integers equal to the number of input optical fibers of the cross-connect, the number of wavelengths carried on each input optical fiber of the cross-connect, and the number of output optical fibers of the cross-connect, respectively. With respect to the first embodiment, $n_1 k_1$ wavelength interchangers are used for situations where $k_2$ is greater than $k_1$. In situations where $k_1$ is greater than or equal to $k_2$, the WDM cross-connect in accordance with the first embodiment can be rendered strictly non-blocking by utilizing $n_2 k_2$ wavelength interchangers.

In accordance with the first embodiment, for the scenario where $k_2$ is greater than $k_1$, the WDM cross-connect comprises a single fabric, $n_1 k_1$ wavelength interchangers and $k_1$ optical switches. Each of the wavelength interchangers is connected to exactly one input port of the fabric and each input port of the fabric is connected to exactly one wavelength interchanger. The input optical fibers of the WDM cross-connect are connected to the $k_1$ optical switches of the cross-connect, which separate out the $n_1$ wavelengths onto $n_1$ optical fibers, which are input to respective wavelength interchangers. Therefore, each wavelength interchanger receives exactly $n_1$ optical fibers. The fabric has output ports that are connected to $k_2$ respective output optical fibers. An analogous WDM cross-connect design can be configured for the scenario where $k_1$ is greater than $k_2$, but $n_2 k_2$ wavelength interchangers and $k_2$ optical switches will need to be used in combination with the fabric to render the cross-connect strictly non-blocking. Those skilled in the art will understand the manner in which this alternative configuration can be provided.

In accordance with another embodiment of the present invention, the WDM cross-connect comprises two fabrics and one or more wavelength interchangers that interconnect the fabrics. The cross-connect in accordance with this embodiment can be rendered strictly non-blocking by utilizing a number of wavelength interchangers equal to $(k_1+k_2)-1$, where $k_1$ and $k_2$ correspond to the number of input and output optical fibers, respectively, of the WDM cross-connect.

In accordance with both of these embodiments, the number of input and output optical fibers of the strictly non-blocking WDM cross-connect can be unequal, although it is not required that they be unequal. This enables the WDM cross-connect of the present invention to be utilized with equipment located downstream of the WDM cross-connect that is configured to receive a different number of input optical fibers than the number of input optical fibers received by the WDM cross-connect.

These and other features and advantages of the present invention will become apparent to those skilled in the art from the following description, drawings and claims.

DETAILED DESCRIPTION OF THE INVENTION

Figure 1:
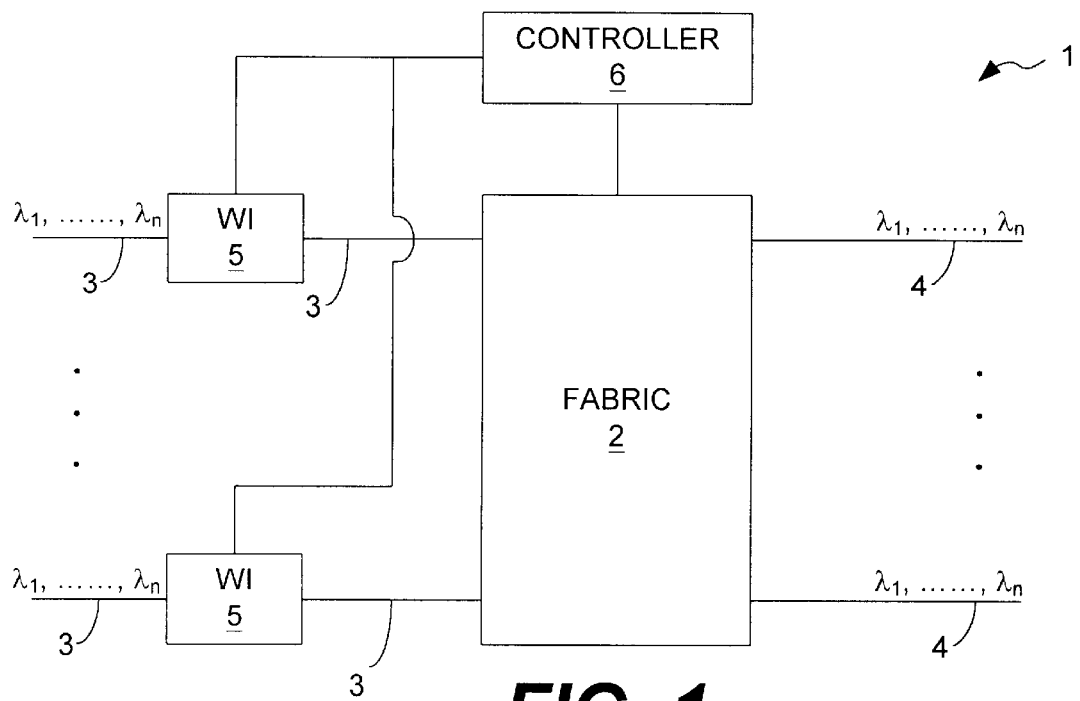
FIG. 1 is block diagram of a WDM cross-connect that is known as a standard design cross-connect.
Figure 2:
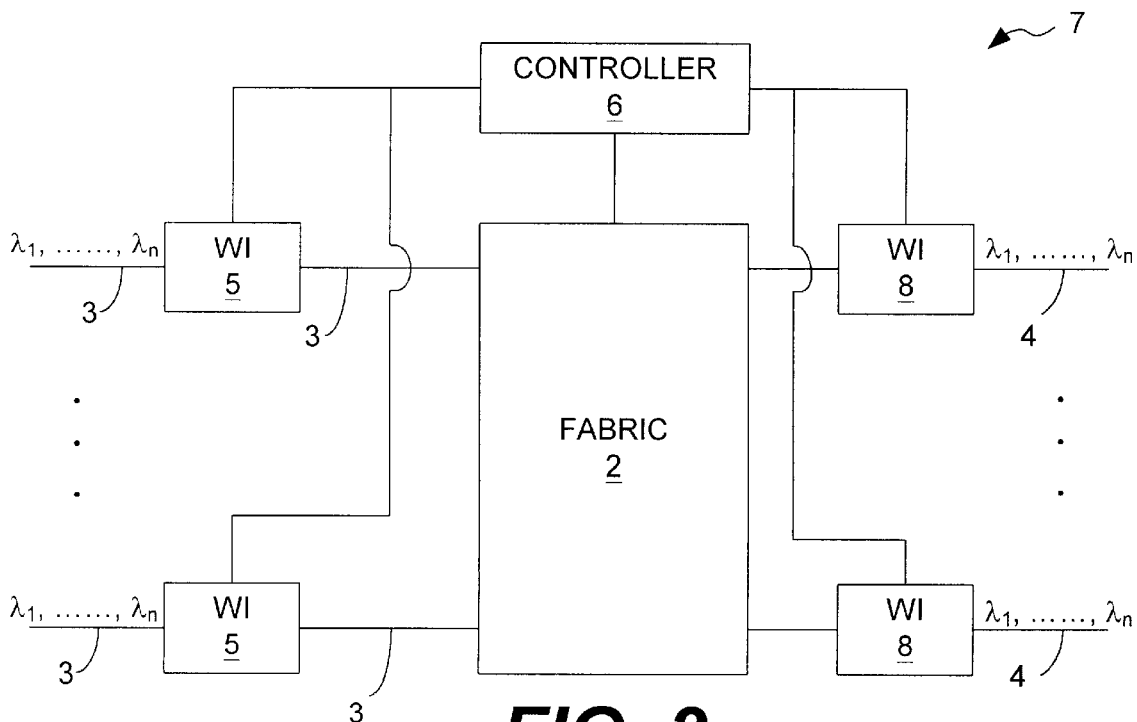
FIG. 2 is a block diagram of a WDM cross-connect that is known as a modified standard design cross-connect.

Both of the WDM cross-connect designs of the present invention enable the WDM cross-connect to be coupled to a different number of input and output fibers, i.e., the ratio of input fibers to output fibers is either less than or greater than 1. This is particularly useful in situations where the equipment located downstream of the WDM cross-connect is adapted for receiving a different number of input fibers than the number of input fibers received by the WDM cross-connect. The WDM cross-connects of the present invention can be rendered strictly non-blocking while utilizing a different number of input and output fibers. Therefore, both of the WDM cross-connects of the present invention will be described as having a different number of input and output fibers. However, those skilled in the art will understand that this is a benefit of the present invention and not a requirement. The WDM cross-connects of the present invention may utilize the same number of input and output fibers and still by strictly non-blocking.

Prior to describing the two WDM cross-connects of the present invention, the variables that are typically used to describe the properties of a WDM cross-connect will be defined. A detailed discussion of the WDM cross-connects of the present invention will then be provided, which will include proofs that utilize these variables and that demonstrate the strictly non-blocking nature of the WDM cross-connects of the present invention.

A $k_1 \times k_2$ WDM cross-connect that supports $n_1 > 1$ input wavelengths and $n_2 > 1$ output wavelengths may be defined as a directed acyclic graph represented by $C = (V, A, \Lambda)$ where V is the set of nodes, A is the set of arcs between the nodes, $\{\lambda_1, \lambda_2, \ldots, \lambda n_1\}$ is the set of available input wavelengths, $\{\zeta_1, \zeta_2, \ldots, \zeta n_2\}$ is the set of available output wavelengths, $k_1$ is an integer equal to the number of input fibers and $k_2$ is an integer equal to the number of output fibers. An arc is typically viewed as corresponding to a fiber having a single direction along which signals are permitted to flow. The node set V is partitioned into four subsets, namely, the set of input nodes, I, the set of output nodes, O, the set of optical switches, S, and the set of wavelength interchangers, W. Set I contains $k_1$ nodes and set O contains $k_2$ nodes. Each node in the set I has an indegree of 0 and an outdegree of 1 whereas each node in set O has an outdegree of 0 and indegree of 1. An arc directed out of a node in set I corresponds to an input fiber and an arc directed into a node in set O corresponds to an output fiber. A node in set W has an indegree 1 and an outdegree 1 whereas the indegree and outdegree of a node in set S are unconstrained, although in current practice they are likely to have an input degree and an output degree equal to 2.

The topology of a cross-connect as given by the directed acyclic graph is typically referred to as the fabric of the cross-connect. However, this definition of the fabric assumes that the wavelength interchangers are part of the fabric. In accordance with the present invention, the fabric is considered to be separate from the wavelength interchangers. Therefore, in accordance with the present invention, the fabric includes the optical switches, the optical fibers and the nodes that comprise the fabric, but not the wavelength interchangers.

A demand, d, is defined as a 4-tuple (w, x, y, z), where w is an input node, x is a wavelength, y is an output node and z is a wavelength. The wavelengths x and z will be referred to as the input and output wavelengths, respectively. A route, r, in cross-connect C is a directed path from a node in set I to a node in set O. Along each of the fibers in a route r, one of the n wavelengths is assigned such that consecutive fibers are assigned the same wavelength, unless the common node of the fibers is in set W. A route for a demand d=(w, x, y, z) is a route from input node w to output node y such that, on the corresponding input fiber, the route is assigned wavelength x and on the corresponding output fiber, the route is assigned wavelength z.

A valid demand set is a set of demands that satisfies the following conditions:
(i) for each input node, a, and each wavelength, $\lambda$, there is at most one demand with both a as the input node and $\lambda$ as the input wavelength; and
(ii) for each output node, b, and each wavelength, $\lambda$, there is at most one demand with both b as the output node and $\lambda$ as the output wavelength.

A demand set $D = \{d_1, d_2, \ldots, d_m\}$ is said to be satisfied by a cross-connect if there exists a set of routes $R = \{r_1, r_2, \ldots, r_m\}$ where:
(i) $r_i$ is a route for $d_i$, $1 \leq i \leq m$; and
(ii) if for some value $i \neq j$, $r_i$ and $r_j$ share some fiber, f, then they must be assigned distinct wavelengths along fiber f. Such a route set, R, is referred to as a valid routing of the demand set D, and R is said to satisfy D. A wavelength interchanger, $WI_j$, services a particular demand, $d_i$, if the demand $d_i$ is routed through wavelength interchanger $WI_j$.

Figure 3:
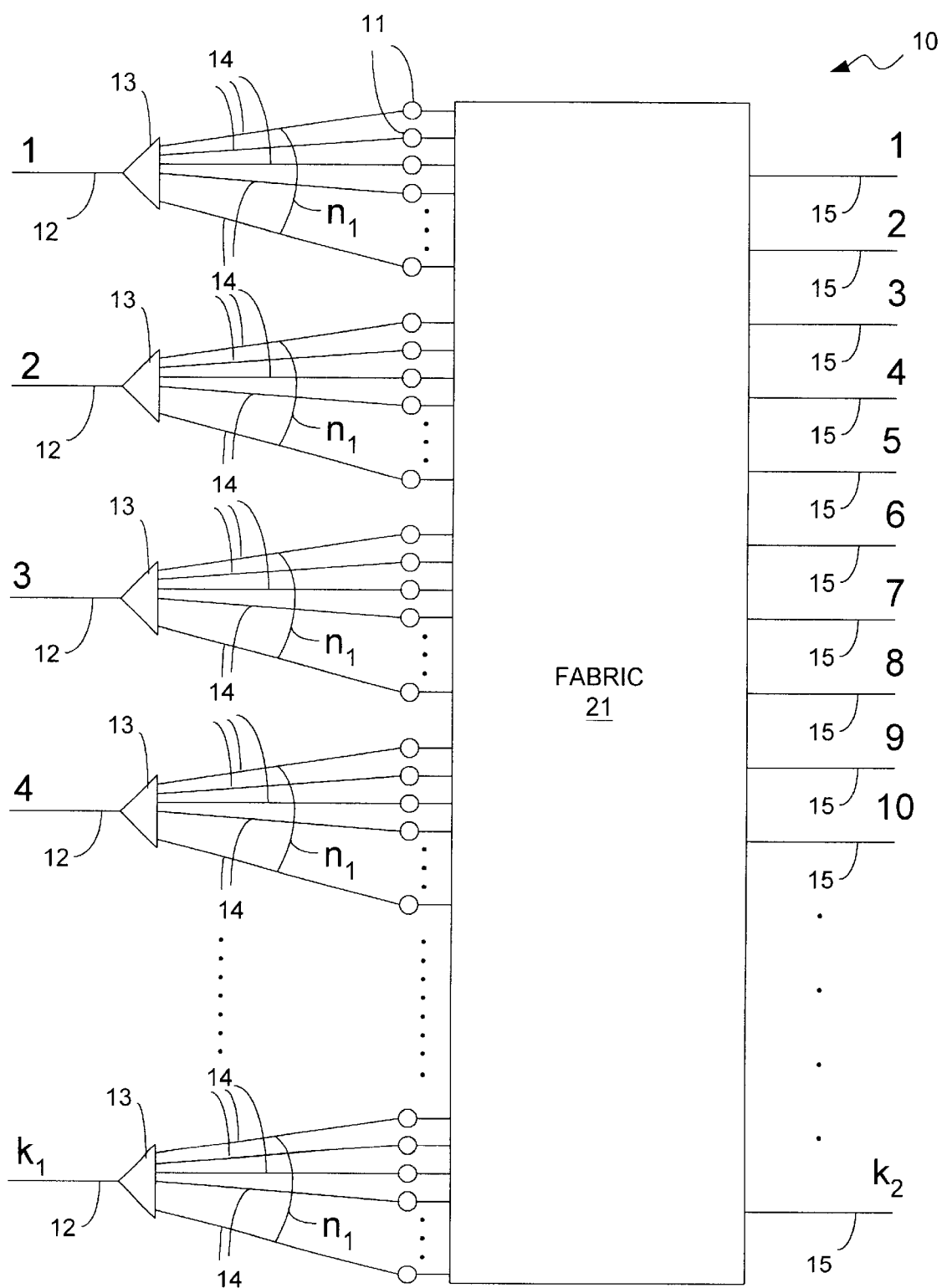
FIG. 3 is a block diagram of the strictly non-blocking WDM cross-connect of the present invention in accordance with the first embodiment.

The WDM cross-connect 10 of the present invention shown in FIG. 3 preferably is constructed in such a way that one dedicated wavelength interchanger exists for each possible request. The wavelength interchangers 11 are represented by the Os in FIG. 3. Each of the input optical fibers 12 carries $n_1$ wavelengths. The total number of input fibers 12 is $k_1$, where $k_1$ is a positive integer. Each input fiber 12 is coupled to a wavelength granularity switch 13 that separates the wavelengths carried on the input fiber 12 and places each of the wavelengths on one of the optical fibers 14. The fibers 14 are coupled to input ports of the wavelength interchangers 11, which are coupled to input ports of the fabric 21, which is pathwise strictly non-blocking.

A controller (not shown) is in communication with the wavelength interchangers 11 and the fabric 21 and controls the operations (e.g., wavelength and path selection) of these components of the WDM cross-connect 10. The fabric 21 is strictly non-blocking. It is well known to design fabrics that are strictly non-blocking. Therefore, the manner in which a suitable fabric is designed and/or chosen will not be discussed herein. The present invention is not limited with respect to the particular fabric design that is utilized with the WDM cross-connect of the present invention.

The WDM cross-connect 10 has $k_2$ output ports that are connected to $k_2$ respective output optical fibers 15, where $k_2$ is a positive integer. Since the number of available input wavelengths is $n_1$ and the number of input fibers is $k_1$, the largest number of demands in any valid demand set is no more than $n_1 k_1$. Each wavelength interchanger 11 can receive signals from exactly one input fiber 12, and the signals from each input fiber 12 can be received by exactly $n_1$ wavelength interchangers 11. The path between any input fiber 12 and any wavelength interchanger 11 is defined by the path from the input fiber 12 to a $1 \times n_1$ wavelength granularity switch 13 followed by a single dedicated fiber 14 and then to a wavelength interchanger 11.

The WDM cross-connect shown in FIG. 3 utilizes $n_1 k_i$ wavelength interchangers 11 in order to be strictly non-blocking. This number of wavelength interchangers is needed for the situation where $k_2$ is greater than $k_1$. As stated above, in the situation where $k_1$ is greater than $k_2$, $n_2 k_2$ wavelength interchangers are needed to render the WDM cross-connect strictly non-blocking. Since those skilled in the art will understand the manner in which both of these configurations can be achieved, only the case where $k_2$ is greater than $k_1$ will be described and proved herein in the interest of brevity.

The following is a proof that demonstrates that the WDM cross-connect 10 constructed in this manner is strictly non-blocking. The proof utilizes mathematical symbols and phraseology that are well known in the art of WDM cross-connect theory and design. Therefore, a detailed discussion of these symbols and of the phraseology used in discussing them will not be provided herein. Those skilled in the art will understand the meanings associated with these symbols and the phraseology used herein in discussing them.

PROOF: Let C be a WDM dedicated cross-connect where the number of wavelength interchangers in C is $n_1 k_1$, as is the case with the WDM cross-connect 10 shown in FIG. 3. To show that C is strictly non-blocking, it must be shown that for any valid routing R of a valid demand set D, and for any valid demand $d \notin D$, there is a valid routing for demand d. Let $d=(a, \lambda_1, b, \lambda_2)$, where d is a demand, where a and b represent an input fiber 12 and an output fiber 15, respectively, and where $\lambda_1$ and $\lambda_2$ represent wavelengths utilized along the route. A route for demand d is defined by a path from input fiber a (12) to some wavelength interchanger $WI_i$ (11) that is edge disjoint from all paths used to route demands in demand set D using the input wavelength $\lambda_1$.

The only part of a path between any input fiber a (12) and any wavelength interchanger 11 that may possibly be shared is the portion of the path corresponding to the input fiber a (12). Since demand set D is a valid demand set and since demand d is valid with respect to demand set D, any available path from input fiber a (12) must be edge disjoint from all other paths in a routing for any other demands that also utilize input wavelength $\lambda_1$. The structure of cross-connect C (10) is such that, for any given input fiber 12, $n_1$ wavelength interchangers $WI_i$(11) exist that are reachable only from that particular input fiber 12. Since no input fiber 12 can function as an input fiber for more than $n_1$ demands, there must be at least one wavelength interchanger $WI_i$(11) reachable only from input fiber a (12) that is not servicing a demand.

Since the fabric 21 is strictly non-blocking, there must be a path from wavelength interchanger $WI_i$ to output fiber b (15) that demand d can be routed along using output wavelength $\lambda_2$. Therefore, cross-connect C (10) can satisfy any new valid demand in terms of both path and wavelength, and thus, is strictly non-blocking. Therefore, the WDM cross-connect 10 comprising $n_1 k_1$ wavelength interchangers is strictly non-blocking. However, in some cases the WDM cross-connect 10 may be require more wavelength interchangers than is absolutely necessary to provide a strictly non-blocking WDM cross-connect. The WDM cross-connect 20 shown in FIG. 4 may be a more suitable cross-connect design in certain cases. The WDM cross-connect 20 can be rendered strictly non-blocking while utilizing only $(k_1+k_2)-1$ wavelength interchangers, whereas the WDM cross-connect 10 shown in FIG. 3 requires $n_1 k_1$ wavelength interchangers in order to be rendered strictly non-blocking. If $n_1$ is much larger than 2, and if $k_1=k_2$, then $n_1 k_1 >> (k_1+k_2)-1$.

Figure 4:
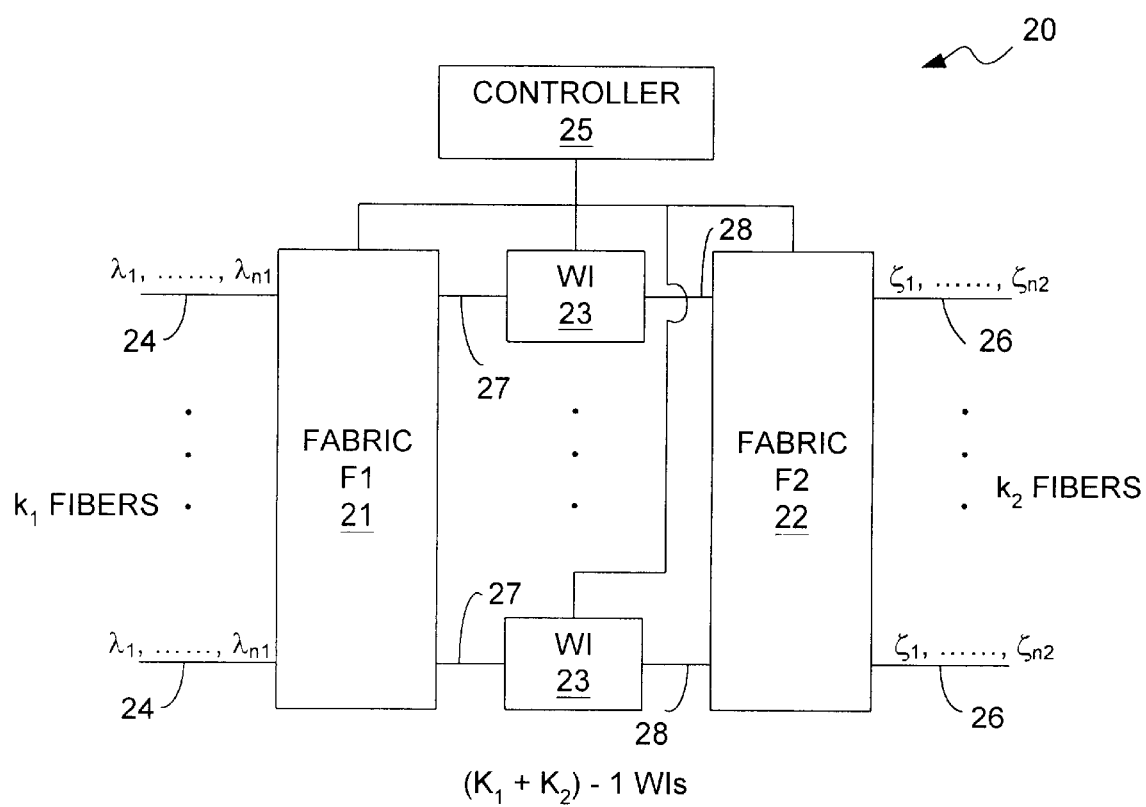
FIG. 4 is a block diagram of the strictly non-blocking WDM cross-connect of the present invention in accordance with a second embodiment.

Therefore, in cases where $n_1 k_1$ is greater than $(k_1+k_2)-1$, the strictly non-blocking WDM cross-connect 20 shown in FIG. 4 may be a more suitable design, since it requires only $(k_1+k_2)-1$ wavelength interchangers. Those skilled in the art will understand, in view of the discussion provided herein, the manner in which a determination can be made as to whether the design shown in FIG. 3 or the design shown in FIG. 4 should be utilized.

A discussion of the second embodiment of the WDM cross-connect of the present invention will now be provided with reference to FIG. 4. In accordance with this embodiment, the fabric of the cross-connect 10 is split into two parts, namely, a first fabric 21 and a second fabric 22. The fabrics 21 and 22 are connected to each other via one or more wavelength interchangers 23. The two parts will be referred to hereinafter as fabric F1 and fabric F2. The fabrics F1 and F2 comprise optical switches and optical fibers. The optical fibers of the fabrics are connected to the optical switches at nodes of the fabrics. The fabrics F1 and F2 do not include any devices for changing the wavelength of any signal.

The operations of the WDM cross-connect 20 are controlled by a controller 25, which may be, for example, a microprocessor programmed with appropriate software. The controller 25 may be identical or similar to the controller utilized with the cross-connect 10 shown in FIG. 3.

The WDM cross-connect 20 is coupled to $k_1$ input fibers 24 and $k_2$ output fibers 26. The first fabric F1 has $k_1$ input ports and $(k_1+k_2)-1$ output ports. The second fabric F2 has $(k_1+k_2)-1$ input ports and $k_2$ output ports. Each of the input ports of the fabric F1 is optically coupled to an input optical fiber 24. Each of the output ports of the second fabric F2 is optically coupled to an output optical fiber 26. $(k_1+k_2)-1$ optical fibers 27 optically couple the output ports of the first fabric F1 to the input ports of the wavelength interchangers 23. $(k_1+k_2)-1$ optical fibers 28 optically couple the output ports of the wavelength interchangers 23 to the input ports of the second fabric F2.

In accordance with this embodiment of the present invention, only $(k_1+k_2)-1$ wavelength interchangers (WIs) are needed to render the WDM cross-connect 20 strictly non-blocking, i.e., both pathwise and wavelength strictly non-blocking. This is true for demands that specify only the input wavelengths or that specify both the input and output wavelengths. Any directed path from an input fiber 24 to an output fiber 26 will pass through exactly one wavelength interchanger 23. Thus, the only location at which a route can change wavelengths is at the single wavelength interchanger 23 along the directed path of the route. Therefore, a route for a demand $(a, \lambda_1, b, \lambda_2)$ will be assigned a wavelength $\lambda_1$ from the input fiber, a (24), until it reaches a wavelength interchanger 23, at which point a wavelength $\lambda_2$ may be assigned for the remainder of the route through the cross-connect 20 and over the output fiber b (26). Thus, the wavelength assignment for any demand is completely determined by the demand.

A proof set forth below proves that the cross-connect 20 of the present invention is both pathwise strictly non-blocking and wavelength strictly non-blocking. To show that the cross-connect 20 is strictly non-blocking, it is assumed that fabrics F1 and F2 are both pathwise strictly non-blocking. The proof then demonstrates that the WDM cross-connect 20 is strictly non-blocking. As with the proof discussed above, this proof utilizes mathematical symbols and phraseology that are well known in the art of WDM cross-connect theory and design. Therefore, a detailed discussion of these symbols and of the phraseology used in discussing them will not be provided herein.

PROOF: As before, to show that a WDM cross-connect C is strictly non-blocking, it must be shown that, for any valid routing R of a valid demand set D, and for any demand $d=(a, \lambda_1, b, \lambda_2)$ that is valid with respect to demand set D, a valid route for demand d exists. Since $F_1$ and $F_2$ are both pathwise strictly non-blocking, if $WI_i$ is any wavelength interchanger having an available input wavelength $\lambda_1$ and available output wavelength $\lambda_2$, then a path exists from input fiber a (24) to $WI_i$ and from $WI_i$ to output fiber b (26) that shares no edge with the output side of any routing in R and no edge with the input side of any routing in R. Therefore, all that needs to be shown to prove that WDM cross-connect C is strictly non-blocking is that at least one wavelength interchanger $WI_i$ exists that has an available input wavelength $\lambda_1$ and an available output wavelength $\lambda_2$.

Since there are never more than $k_1$ demands that use the same input wavelength and $k_2$ demands that use the same output wavelength in any set of valid demands, there can be at most $k_1-1$ and $k_2-1$ demands in demand set D that use input wavelength $\lambda_1$ and output wavelength $\lambda_2$, respectively. Therefore, there is at least 1 (i.e., $k_1+k_2-1$ $(k_1+k_2-2)=1$) wavelength interchanger $WI_i$ that can service a demand with input wavelength $\lambda_1$ and output wavelength $\lambda_2$.

As long as $k_2 \leq (n_1-1)k_1$, then $k_1+k_2-1 < n_1 k_1$, and utilization of the WDM cross-connect shown in FIG. 4 will result in the use of fewer wavelength interchangers than that which would be required for use of the WDM cross-connect shown in FIG. 3. On the other hand, if $k_2 > (n_1-1)k_1$, then utilization of the WDM cross-connect shown in FIG. 3 will result in the use of fewer wavelength interchangers. Therefore, considerations as to which of these two designs will utilize fewer wavelength interchangers should be taken into account in determining which of these designs to utilize.

The present invention has been described with reference to the preferred embodiments. However, those skilled in the art will understand that the present invention is not limited to the embodiments explicitly described herein. Those skilled in the art will understand that modifications may be made to the embodiments discussed above that are within the scope of the present invention. It will also be understood that the present invention is not limited with respect to the types of components that are used to create the cross-connect 10 of the present invention. Those skilled in the art will understand that a variety of different components may be used to produce the fabrics F1 and F2 and the wavelength interchangers 13. Those skilled in the art will also understand that a variety of different types of controllers may be used for the controller 15. Those skilled in the art will understand the manner in which a suitable controller may be selected and implemented for controlling the operations of the cross-connect 10.

What is claimed is:

1. A wavelength division multiplexed (WDM) device, the device comprising:
 a fabric having a number of input ports equal to a product of $(n_1 \times k_1)$ and a number of output ports equal to $k_2$, wherein $n_1$, $k_1$ and $k_2$ are integers, each of the output ports being adapted to be optically coupled to an output optical fiber associated with the fabric, the fabric being capable of selecting an output optical fiber associated therewith that a signal received at an input port of the fabric is to be routed onto;
 $k_1$ optical switches, each of said $k_1$ optical switches being adapted to be optically coupled to an input optical fiber associated with the WDM device, each of said $k_1$ optical switches being optically coupled to $n_1$ output optical fibers of the optical switch; and
 a plurality of wavelength interchangers, each wavelength interchanger having an input port and an output port, each wavelength interchanger being optically coupled at an input port thereof to a respective one of the output optical fibers of a respective one of said $k_1$ optical switches, each of said wavelength interchangers receiving a wavelength at the input port and converting said wavelength to a different wavelength for said output port, each wavelength interchanger selecting a wavelength that a signal carried on the optical fiber coupled to the input port of the wavelength interchanger is to utilize when transmitted through the fabric.

2. The device of claim 1, wherein $k_1$ is equal to the number of input optical fibers associated with said optical switches, with each switch being coupled to exactly one input optical fiber, and wherein $n_1$ is equal to a number of wavelengths carried on each input optical fiber associated with said optical switches, and wherein $k_2$ is equal to the number of output optical fibers associated with the fabric, and wherein $k_1$ and $k_2$ are equal.

3. The device of claim 1, wherein $k_1$ is equal to the number of input optical fibers associated with said optical switches, with each switch being coupled to exactly one input optical fiber, and wherein $n_1$ is equal to a number of wavelengths carried on each input optical fiber associated with said optical switches, and wherein $k_2$ is equal to the number of output optical fibers associated with the fabric, and wherein $k_1$ is greater than $k_2$.

4. The device of claim 1, wherein $k_1$ is equal to the number of input optical fibers associated with said optical switches, with each switch being coupled to exactly one input optical fiber, and wherein $n_1$ is equal to a number of wavelengths carried on each input optical fiber associated with said optical switches, and wherein $k_2$ is equal to the number of output optical fibers associated with the fabric, and wherein $k_2$ is greater than $k_1$.

5. The device of claim 1, further comprising:
 a controller in communication with the fabric and with the wavelength interchangers, the controller outputting control signals to the fabric and the wavelength interchangers, the control signals being utilized by the fabric and the wavelength interchangers to control the operations thereof.

6. The device of claim 1, wherein the device is strictly non-blocking in terms of both wavelength and routing.

7. The device of claim 6, wherein each wavelength interchanger selects a wavelength that is to be utilized by a signal based on the control signal received by the wavelength interchanger from the controller.

8. A wavelength division multiplexed (WDM) device, the device comprising:
 a first fabric having at least one input port and at least one output port, each said at least one input port being adapted to be optically coupled to a respective input optical fiber associated with the first fabric, each said at least one output port being optically coupled to a respective output optical fiber;
 at least one wavelength interchanger, said at least one wavelength interchanger having an input port and an output port, the input port of each said at least one wavelength interchanger being optically coupled to a respective output optical fiber of the first fabric, wherein said wavelength interchanger receiving a wavelength at an input port and converting said wavelength to a different wavelength for said output port; and
 a second fabric, the second fabric having at least one input port and at least one output port, each said at least one input port of the second fabric being optically coupled to a respective input optical fiber of the second fabric, each said respective input optical fiber of the second fabric being optically coupled to an output port of a respective one of said at least one wavelength interchanger, each said at least one output port of the second fabric being adapted to be optically coupled to a respective output optical fiber associated with the second fabric, and wherein the number of input optical fibers associated with the first fabric is unequal to the number of output optical fibers associated with the second fabric.

9. The device of claim 8, further comprising:

a controller in communication with the first fabric, the second fabric and said at least one wavelength interchanger, the controller outputs control signals to the first fabric, the second fabric and said at least one wavelength interchanger, the control signals being utilized by the first fabric, the second fabric and said at least one wavelength interchanger to control the operations thereof.

10. The device of claim 9, wherein the device is strictly non-blocking in terms of both wavelength and routing, and wherein each said wavelength interchanger selects a wavelength that a signal received at the input port of the wavelength interchanger is to utilize on the output optical fiber coupled to the output port of the wavelength interchanger.

11. The device of claim 10, wherein each input optical fiber that is optically coupled to an input port of the first fabric carries signals at one or more of a plurality of different wavelengths, and wherein each output optical fiber optically coupled to the output ports of the second fabric carries optical signals at one or more of a plurality of different wavelengths.

12. The device of claim 11, wherein each said at least one wavelength interchanger selects a wavelength that is to be utilized by a signal based on the control signal received by the wavelength interchanger from the controller.

13. The device of claim 8, wherein the device comprises $(k_1+k_2)-1$ wavelength interchangers, and wherein $k_1$ represents the number of input optical fibers associated with the first fabric and wherein $k_2$ represents the number of output optical fibers associated with the second fabric.

14. A wavelength division multiplexed (WDM) device, the device comprising:

a first fabric having $k_1$ input ports and $(k_1+k_2)-1$ output ports, each of the input ports being adapted to be optically coupled to an input optical fiber associated with the first fabric, each of the output ports being adapted to be optically coupled to an output optical fiber associated with the first fabric, the first fabric selecting an output optical fiber that a signal received on an input optical fiber is to be routed onto;

a plurality of wavelength interchangers, each wavelength interchanger having an input port and an output port, each wavelength interchanger being optically coupled at an input port thereof to a respective one of the output optical fibers associated with the first fabric, each wavelength interchanger selecting a wavelength that a signal carried on the optical fiber coupled to the input port of the wavelength interchanger is to utilize when transmitted on the optical fiber coupled to the output port of the wavelength interchanger; and a second fabric having $(k_1+k_2)-1$ input ports and $k_2$ output ports, each of the input ports of the second fabric being optically coupled by an input optical fiber of the second fabric to an output port of a respective one of the wavelength interchangers, each output port of the second fabric being adapted to be optically coupled to an output optical fiber associated with the second fabric, the second fabric selecting an output optical fiber of the second fabric that an optical signal carried on an input optical fiber of the second fabric is to be routed onto, wherein $k_1$ is an integer equal to the number of input optical fibers associated with the first fabric and wherein $k_2$ is an integer equal to the number of output optical fibers associated with the second fabric.

15. The device of claim 14, further comprising:

a controller in communication with the first fabric, the second fabric and the wavelength interchangers, the controller controlling which output optical fibers of the first and second fabrics are to be utilized for carrying signals received on input optical fibers of the first and second fabrics, respectively, and wherein the controller controls the selection of wavelengths by the wavelength interchangers.

16. The device of claim 15, wherein the device is strictly non-blocking in terms of both wavelength and routing.

17. The device of claim 16, wherein each input optical fiber that is optically coupled to an input port of the first fabric carries signals at one or more of a plurality of different wavelengths, and wherein each output optical fiber that is coupled to the output ports of the second fabric carries optical signals at one or more of a plurality of different wavelengths.

18. The device of claim 17, wherein each of the wavelength interchangers permutes a signal of a particular wavelength to a different wavelength, and wherein the selection by each wavelength interchanger of a wavelength that a signal is to utilize when transmitted on the optical fiber coupled to the output port of the wavelength interchanger is made in accordance with the control signal received by the wavelength interchanger.

19. The device of claim 8, wherein the first and second fabrics are pathwise strictly non-blocking.

20. The device of claim 8, wherein the first and second fabrics are pathwise wide-sense non-blocking, and wherein the device is wavelength strictly non-blocking and is pathwise wide-sense non-blocking.

21. The device of claim 14, wherein the first and second fabrics are pathwise strictly non-blocking.

22. The device of claim 14, wherein the first and second fabrics are pathwise wide-sense non-blocking, and wherein the device is wavelength strictly non-blocking and is pathwise wide-sense non-blocking.

* * * * *